Aug. 18, 1925.

B. LIEBOWITZ 1,549,996

METHOD OF REDUCING TORSIONAL OSCILLATIONS OF SHAFTS

Filed July 20, 1923

Inventor
Benjamin Liebowitz
By his Attorney

Patented Aug. 18, 1925.

1,549,996

UNITED STATES PATENT OFFICE.

BENJAMIN LIEBOWITZ, OF READING, PENNSYLVANIA.

METHOD OF REDUCING TORSIONAL OSCILLATIONS OF SHAFTS.

Application filed July 20, 1923. Serial No. 652,695.

*To all whom it may concern:*

Be it known that I, BENJAMIN LIEBOWITZ, a citizen of the United States, residing at the city of Reading, county of Berks, and State of Pennsylvania, have invented a certain new and useful Improvement in Methods of Reducing Torsional Oscillations of Shafts, of which the following is a specification.

This invention relates to methods and apparatus for reducing torsional oscillations, such as occur in the shaft of internal combustion engines, especially when running at "critical" speeds, and has for its object to reduce such oscillations by simple methods.

I accomplish this object by artificially enhancing the internal friction of the material of the shaft, preferably prior to its installation in the engine or other apparatus where it is to utilized, so that the internal friction of the material of the shaft will be increased to an extent sufficient to limit the amplitudes of torsional oscillations which may be set up in said shaft.

Consider the case of an automobile crankshaft. Together with the masses attached thereto, such as connecting rods and pistons, such a shaft comprises an oscillatory system having several periods of "free vibration", the number of free periods depending on the number of throws on the shaft, etc. When the frequency of the forces impressed on the shaft, due to explosion pressure or to inertia of reciprocating masses, coincides with one of the free periods, resonance occurs, causing large amplitudes of vibration of the shaft, and "roughness" in the motor. From the general theory of vibrations it is well understood that friction in the oscillatory system is the factor which limits the amplitude of such oscillations.

In most engines, the friction which limits the amplitude of such vibrations is the friction in the bearings, connecting rods, pistons, timing gears, etc., and also the internal friction in the shaft itself. In some engines, additional friction is introduced by means of so-called vibration dampers, but such dampers require frequent and delicate adjustment and furthermore add to the weight and cost of the engine.

In this invention, the internal friction of the material of the shaft is utilized as a vibration damper.

A simple experiment with ordinary tuning forks will illustrate how important a rôle may be played by the internal friction of metal in the dampening of oscillations. If two similar forks are sounded by striking substantially the same blow, they will emit, under ordinary conditions, substantially the same volume of tone. If one of the forks is overstressed by forcing the prongs apart beyond the elastic limit, and then forcing them back again to their original shape, the volume of tone emitted by that fork, when struck the same blow, is greatly diminished. In general, however, the fork will recover in time, and will give substantially its original volume of sound. Such recovery may be hastened by keeping the fork in boiling water.

It was found by William Thompson (Lord Kelvin) in 1865, working with torsional oscillations of wires, that continued oscillations increase the internal friction of wires. In line with this, a tendency has been noted in automobile engines for the "critical speeds" to become less pronounced, or to practically vanish, after continuous operation of the engine, due to increased internal friction in the crankshaft. With rest, the shaft tends to "recover", of course, but if the shaft is thoroughly "fatigued", recovery is slow, and the condition of high internal friction is generally restored quickly in service. Of course, the material of the shaft, and the heat treatment, play an important part in this phenomenon. My experiments indicate that the softer the steel of the shaft, i. e., the higher the temperature of draw for a given carbon content, the more readily may a high internal friction be induced.

In this invention, a high state of internal friction may be induced in the manufacturing processes, by twisting the shaft cold, considerably beyond the elastic limit without however destroying the shaft, and then, if desired, forcing it back to its original shape; or several such twists may be imposed on the shaft; or the throws may be put into their proper angular position by cold twisting.

I prefer, however, to induce high internal friction by subjecting the shaft, after all machining operations are complete, but prior to its installation in the engine, to repearted torsional oscillations.

Convenient means for doing this are diagrammatically shown in the accompanying drawing, in which, Fig. 1, shows a plan view;

Fig. 2, an end elevation of one arrangement for subjecting the shaft to repeated torsional vibrations in order to induce a high state of internal friction;

In these drawings I have chosen for illustration the crankshaft of a six-cylinder, four-bearing, automobile engine.

Figures 1, 2:
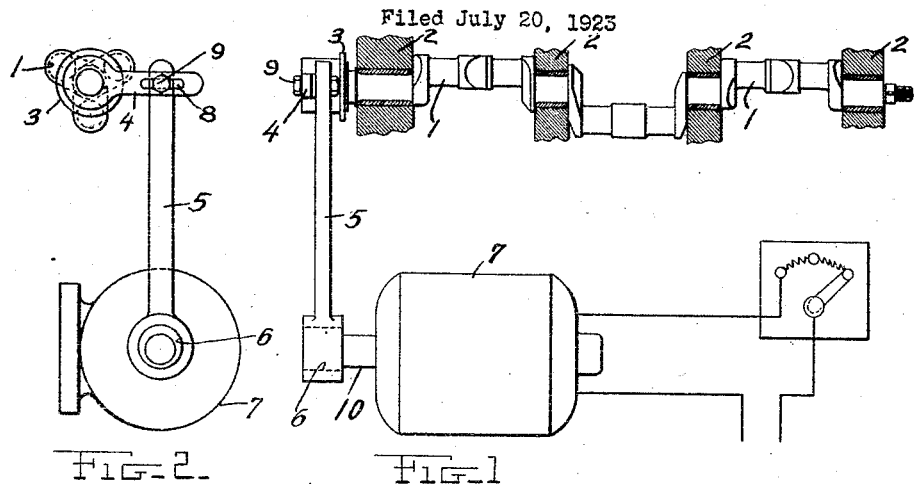

Referring to Figs. 1 and 2, 1 represents the shaft under treatment, 2 are bearing boxes in any convenient support, such as the crank-case of an engine. A flange 3 is shown, such as is customarily formed on such shafts for subsequently attaching a flywheel. By means of this flange, or in any other convenient manner, an arm 4 is fastened to the shaft. Pivotally attached by stud 9 to this arm is a connecting rod 5. The far end of 5 fits on an eccentric 6, which eccentric may be mounted on an end of the shaft 10 of a variable speed electric motor 7, or may otherwise be rotated at chosen speeds. The effective length of arm 4 may be varied by means of slot 8 in arm 4.

In operation, the shaft 10 on which the eccentric 6 is mounted is rotated at a certain speed, preferably at a speed corresponding to the fundamental critical speed of the shaft. The amplitude of the oscillation impressed on the shaft 1 is regulated by shifting the stud 9 up or down in the slot 8. By running the eccentric at a critical speed of the shaft 1, resonance steps in and builds up large oscillations in shaft 1. The nearer bolt 9 is fastened to the axis of shaft 1, the larger will the impressed vibrations be and hence the larger will be the resonance oscillations of shaft 1. The larger these oscillations, the more quickly will the state of high internal friction be induced, but if made too large, these vibrations may result in fracturing shaft 1. Large oscillations, however, will tend to reduce the time of treatment.

Figure 3:
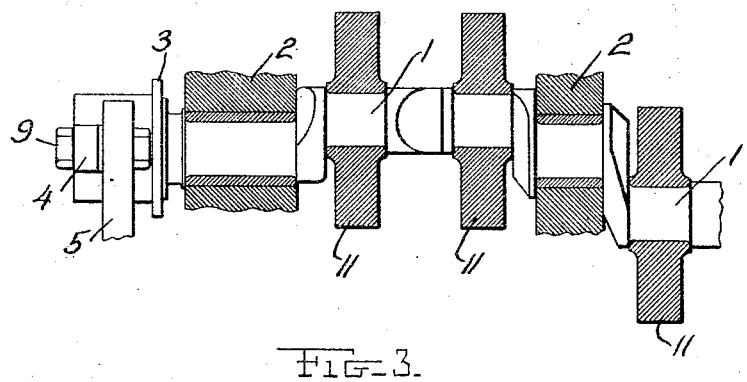
Fig. 3, is a fragmentary view showing a modification.
Figure 4:
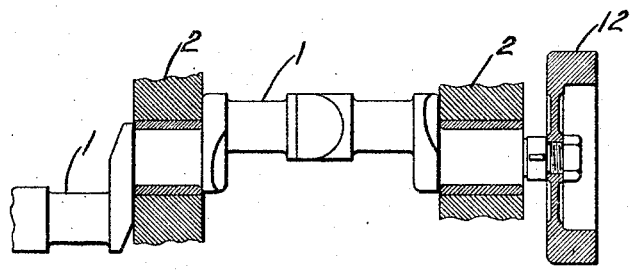
Fig. 4, shows another modification.

The critical speed of the naked shaft 1 will generally be fairly high. If desired, this speed may be lowered by weighting the throws of shaft 1 with weight 11, shown in Fig. 3. These weights may have any desired value. By making these weights so that they correspond to the reciprocating and rotating masses subsequently to be fastened to the shaft when installed in the engine, the conditions under which the treatment is given to the shaft can be made to reproduce substantially the actual operating conditions of the shaft after installation in the engine. This is desirable, in that it will bring about a state of high internal friction in those parts of the shaft where it is most required. For similar reasons, a small flywheel 12, shown in Fig. 4, may be fastened to the far end of the shaft 1. This may be used with or without weights 11. The weights 11 need not be all the same. They may be tightly fastened on the throws, or freely fitting thereon. The latter corresponds to the conditions existing in actual operation of the shaft.

The impressed oscillations need not necessarily correspond to the lowest critical speed of the shaft. If desired, the treatment may be given at different speeds.

It is not necessary that this treatment be given prior to installation of the shaft in its engine, but is desirable in order to avoid undue wear of bearings, etc. Furthermore, the friction in bearings, etc., of a newly assembled engine will interfere with the development of large resonance amplitudes in the shaft, and hence may inhibit the development of high internal friction.

While I have described a form of apparatus suitable for use in reducing torsional oscillations of shafts of internal combustion engines, it is to be understood that I do not limit the invention to the particular apparatus, or to the particular use described.

What I claim is:

1. A method of reducing torsional oscillations in a shaft, which consists in enhancing by mechanical overstrain the internal friction of the material of said shaft prior to its installation in the machine in which it is to operate.

2. The method of reducing torsional vibrations in a shaft, which consists in subjecting said shaft to repeated oscillations prior to its installation in the engine in which it is to be utilized, in order to enhance its internal friction.

3. The method of reducing torsional vibrations in a shaft, which consists in subjecting said shaft to repeated oscillations of frequency corresponding to a free period of said shaft, so as to enhance its internal friction prior to its installation in the engine in which it is to be used.

BENJAMIN LIEBOWITZ.